(12) United States Patent
Lethellier et al.

(10) Patent No.: US 10,559,405 B2
(45) Date of Patent: Feb. 11, 2020

(54) CABLE CONFIGURED TO REDUCE A RADIATED ELECTROMAGNETIC FIELD

(71) Applicant: Wireless Advanced Vehicle Electrification, Inc., Salt Lake City, UT (US)

(72) Inventors: Patrice Lethellier, Salt Lake City, UT (US); Ryan Calder, Saratoga Springs, UT (US); Marcellus Harper, Kaysville, UT (US)

(73) Assignee: Wireless Advanced Vehicle Electrification, Inc., Salt Lake City, UT (US)

( * ) Notice: Subject to any disclaimer, the term of this patent is extended or adjusted under 35 U.S.C. 154(b) by 0 days.

(21) Appl. No.: 16/264,421

(22) Filed: Jan. 31, 2019

(65) Prior Publication Data

US 2019/0237219 A1 Aug. 1, 2019

Related U.S. Application Data

(60) Provisional application No. 62/624,289, filed on Jan. 31, 2018.

(51) Int. Cl.
*H01B 9/00* (2006.01)
*H01B 7/282* (2006.01)
*H02J 50/10* (2016.01)

(52) U.S. Cl.
CPC ........... *H01B 9/006* (2013.01); *H01B 7/2825* (2013.01); *H01B 9/003* (2013.01); *H02J 50/10* (2016.02)

(58) Field of Classification Search
CPC ...... H01B 9/006; H01B 7/2825; H01B 9/003; H02J 50/10
USPC .......................................................... 174/115
See application file for complete search history.

(56) References Cited

U.S. PATENT DOCUMENTS

| | | | |
|---|---|---|---|
| 2009/0316753 A1* | 12/2009 | Bulatowicz | G01R 33/31 374/185 |
| 2010/0260247 A1* | 10/2010 | Albiston | H04B 3/548 375/222 |

* cited by examiner

*Primary Examiner* — Tremesha S Willis
(74) *Attorney, Agent, or Firm* — Kunzler Bean & Adamson, PC; Bruce R. Needham

(57) ABSTRACT

A transmission cable to reduce radiated electromagnetic radiation includes a first conductor with current flowing in a positive direction, a second conductor with a current flowing in a negative direction, where the negative direction is opposite the positive direction and the current in the first conductor equal to the current in the second conductor, a third conductor with current flowing in the positive direction and a fourth conductor with a current flowing in the negative direction. The current in the third conductor is equal to the current in the fourth conductor. The first conductor, the second conductor, the third conductor, and the fourth conductor are arranged in a symmetrical square pattern and the conductors are each on a corner of the square pattern. The first conductor is opposite the third conductor and adjacent to the second conductor and the fourth conductor.

17 Claims, 4 Drawing Sheets

CABLE CONFIGURED TO REDUCE A RADIATED ELECTROMAGNETIC FIELD

CROSS-REFERENCES TO RELATED APPLICATIONS

This application claims the benefit of U.S. Provisional Patent Application No. 62/624,289 entitled "CABLE CONFIGURED TO REDUCE A RADIATED ELECTROMAGNETIC FIELD" and filed on Jan. 31, 2018 for Patrice Lethellier, et al., which is incorporated herein by reference.

FIELD

This invention relates to power and signal cables and more particularly relates to a cable configured to reduce a radiated electromagnetic field.

BACKGROUND

Wireless power transfer is an effective method for transferring power without connections. As power levels for wireless power transfer rise, radiated electromagnetic fields become stronger and methods to reduce electromagnetic radiation become more important.

SUMMARY

A transmission cable to reduce radiated electromagnetic radiation includes a first conductor with current flowing in a positive direction, a second conductor with a current flowing in a negative direction, where the negative direction is opposite the positive direction and the current in the first conductor equal to the current in the second conductor, a third conductor with current flowing in the positive direction and a fourth conductor with a current flowing in the negative direction. The current in the third conductor is equal to the current in the fourth conductor. The first conductor, the second conductor, the third conductor, and the fourth conductor are arranged in a symmetrical square pattern and the conductors are each on a corner of the square pattern. The first conductor is opposite the third conductor and adjacent to the second conductor and the fourth conductor.

Another transmission cable includes a first conductor with current flowing in a positive direction, a second conductor with a current flowing in a negative direction, where the negative direction is opposite the positive direction and the current in the first conductor is equal to the current in the second conductor, a third conductor with current flowing in the positive direction, and a fourth conductor with a current flowing in the negative direction. The current in the third conductor is equal to the current in the fourth conductor. The first conductor, the second conductor, the third conductor, and the fourth conductor are power transmission conductors and are arranged in a symmetrical square pattern. The conductors are each on a corner of the square pattern and the first conductor is opposite the third conductor and adjacent to the second conductor and the fourth conductor. The transmission cable includes a signal conductor located in a center of the square pattern. The signal conductor transmits data associated with power transmission of the first, second, third and fourth conductors. The transmission cable includes grounded conductors surrounding the signal conductor and insulation between the signal conductor and the grounded conductors and insulation between the grounded conductors and the first, second, third and fourth conductors.

Another transmission cable includes a first conductor with current flowing in a positive direction, a second conductor with a current flowing in a negative direction, where the negative direction is opposite the positive direction and the current in the first conductor is equal to the current in the second conductor, a third conductor with current flowing in the positive direction, and a fourth conductor with a current flowing in the negative direction. The current in the third conductor is equal to the current in the fourth conductor. The first conductor, the second conductor, the third conductor, and the fourth conductor are each litz wire, each include an outer sheath, and are power transmission conductors. The first conductor, the second conductor, the third conductor, and the fourth conductor are arranged in a symmetrical square pattern where the conductors are each on a corner of the square pattern, and the first conductor is opposite the third conductor and is adjacent to the second conductor and the fourth conductor.

The transmission cable includes a signal conductor located in a center of the square pattern, where the signal conductor transmits data associated with power transmission of the first, second, third and fourth conductors. The transmission cable includes grounded conductors surrounding the signal conductor, insulation between the signal conductor and the grounded conductors and insulation between the grounded conductors and the first, second, third and fourth conductors. The transmission cable includes an outer sheath surrounding the conductors in the square pattern, where the outer sheath is rated for underground installation. The current in the first and second conductors is equal to the current in the third and fourth conductors.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
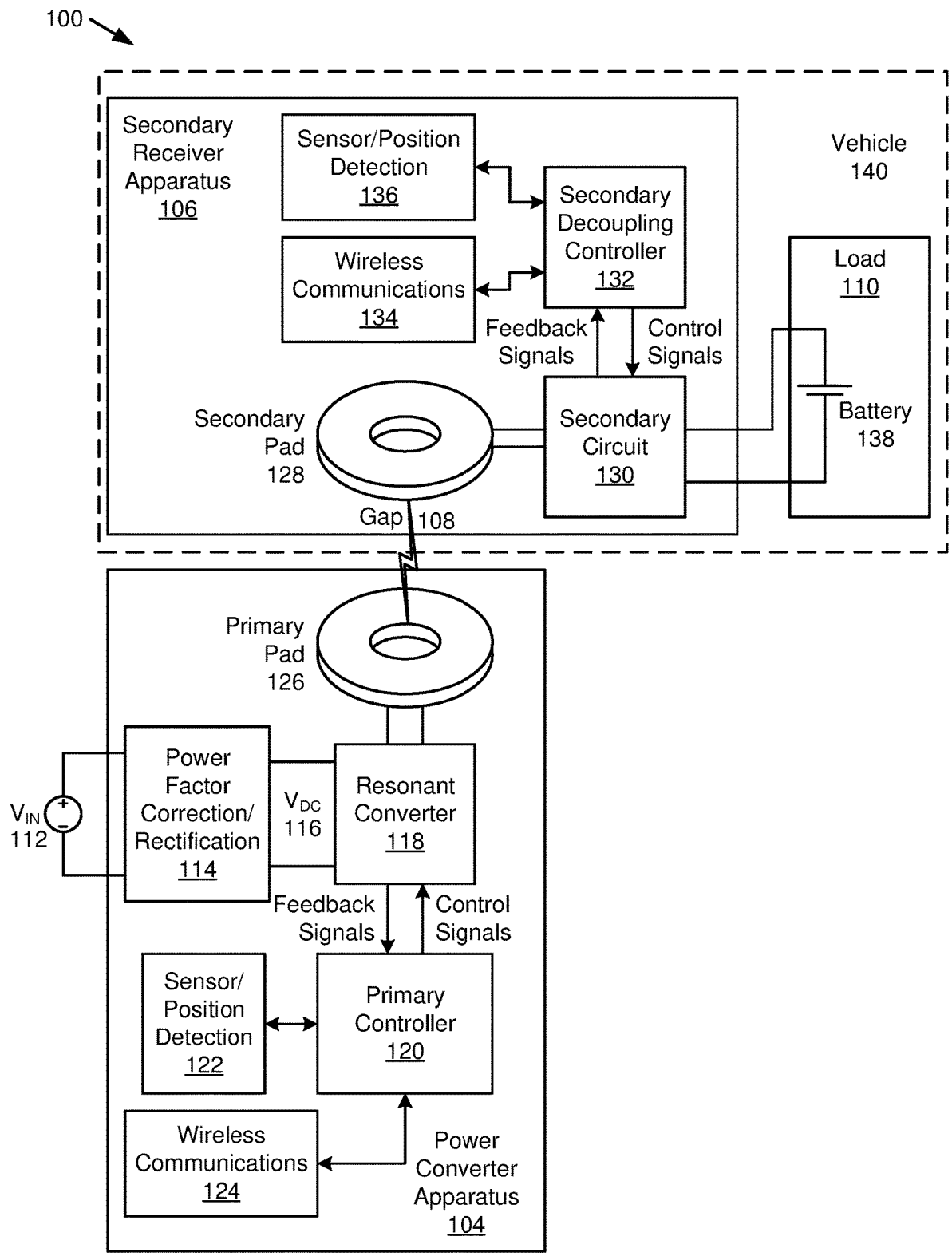
FIG. 1 is a schematic block diagram illustrating one embodiment of a system with a low voltage wireless power transfer ("WPT") pad.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of hardware modules, hardware circuits, hardware components, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

A transmission cable to reduce radiated electromagnetic radiation includes a first conductor with current flowing in a positive direction, a second conductor with a current flowing in a negative direction, where the negative direction is opposite the positive direction and the current in the first conductor equal to the current in the second conductor, a third conductor with current flowing in the positive direction and a fourth conductor with a current flowing in the negative direction. The current in the third conductor is equal to the current in the fourth conductor. The first conductor, the second conductor, the third conductor, and the fourth conductor are arranged in a symmetrical square pattern and the conductors are each on a corner of the square pattern. The first conductor is opposite the third conductor and adjacent to the second conductor and the fourth conductor.

In some embodiments, the transmission cable includes one or more signal conductors located in a center of the square pattern. In further embodiments, the first, second, third and fourth conductors are power transmission conductors and the one or more signal conductors transmit data associated with power transmission of the first, second, third and fourth conductors. In other embodiments, the transmission cable includes grounded conductors surrounding the one or more signal conductors. In other embodiments, the transmission cable includes insulation between the one or more signal conductors and the grounded conductors and insulation between the grounded conductors and the first, second, third and fourth conductors.

In some embodiments, each of the first conductor, the second conductor, the third conductor, and the fourth conductor comprise litz wire. In other embodiments, the first conductor and the second conductor are part of a first circuit, and the third conductor and the fourth conductor are part of a second circuit. In other embodiments, the current in the first and second conductors is equal to the current in the third and fourth conductors.

In some embodiments, the first, second, third and fourth conductors each comprise an insulating sheath and the transmission cable includes an outer sheath surrounding the conductors in the square pattern, where the outer sheath is rated for underground installation. In other embodiments, the outer sheath is watertight. In other embodiments, the transmission cable transmits power between a wireless power transmission ("WPT") pad and a converter within a WPT system.

Another transmission cable includes a first conductor with current flowing in a positive direction, a second conductor with a current flowing in a negative direction, where the negative direction is opposite the positive direction and the current in the first conductor is equal to the current in the second conductor, a third conductor with current flowing in the positive direction, and a fourth conductor with a current flowing in the negative direction. The current in the third conductor is equal to the current in the fourth conductor. The first conductor, the second conductor, the third conductor, and the fourth conductor are power transmission conductors and are arranged in a symmetrical square pattern. The conductors are each on a corner of the square pattern and the first conductor is opposite the third conductor and adjacent to the second conductor and the fourth conductor. The transmission cable includes a signal conductor located in a center of the square pattern. The signal conductor transmits data associated with power transmission of the first, second, third and fourth conductors. The transmission cable includes grounded conductors surrounding the signal conductor and insulation between the signal conductor and the grounded conductors and insulation between the grounded conductors and the first, second, third and fourth conductors.

In some embodiments, each of the first conductor, the second conductor, the third conductor, and the fourth conductor comprise litz wire. In other embodiments, the first conductor and the second conductor are part of a first circuit, and the third conductor and the fourth conductor are part of a second circuit. In other embodiments, the current in the first and second conductors is equal to the current in the third and fourth conductors. In other embodiments, the first, second, third and fourth conductors each comprise an insulating sheath and the transmission cable includes an outer sheath surrounding the conductors in the square pattern, the outer sheath rated for underground installation. In other embodiments, the outer sheath is watertight. In other embodiments, the transmission cable transmits power between a WPT pad and a converter within a WPT system.

Another transmission cable includes a first conductor with current flowing in a positive direction, a second conductor with a current flowing in a negative direction, where the negative direction is opposite the positive direction and the current in the first conductor is equal to the current in the second conductor, a third conductor with current flowing in the positive direction, and a fourth conductor with a current flowing in the negative direction. The current in the third conductor is equal to the current in the fourth conductor. The first conductor, the second conductor, the third conductor, and the fourth conductor are each litz wire, each include an outer sheath, and are power transmission conductors. The first conductor, the second conductor, the third conductor, and the fourth conductor are arranged in a symmetrical square pattern where the conductors are each on a corner of the square pattern, and the first conductor is opposite the third conductor and is adjacent to the second conductor and the fourth conductor.

The transmission cable includes a signal conductor located in a center of the square pattern, where the signal conductor transmits data associated with power transmission of the first, second, third and fourth conductors. The transmission cable includes grounded conductors surrounding the signal conductor, insulation between the signal conductor and the grounded conductors and insulation between the grounded conductors and the first, second, third and fourth conductors. The transmission cable includes an outer sheath surrounding the conductors in the square pattern, where the outer sheath is rated for underground installation. The current in the first and second conductors is equal to the current in the third and fourth conductors.

FIG. 1 is a schematic block diagram illustrating one embodiment of a wireless power transfer ("WPT") system 100 with a low voltage WPT pad. The WPT system 100 includes a power converter apparatus 104 and a secondary receiver apparatus 106 separated by a gap 108, and a load 110, which are described below.

The WPT system 100 includes a power converter apparatus 104 that receives power from a power source 112 and transmits power over a gap 108 to a secondary receiver apparatus 106, which transfers power to a load 110. The power converter apparatus 104, in one embodiment, may be called a switching power converter and includes a resonant converter 118 that receives a direct current ("DC") voltage from a DC bus 116.

In one embodiment, the power source 112 provides DC power to the DC bus 116. In another embodiment, the power source 112 is an alternating current ("AC") power source, for example from a building power system, from a utility, from a generator, etc. and the power converter apparatus 104 includes a form of rectification to provide DC power to the DC bus 116. For example, the rectification may be in the form of a power factor correction and rectification circuit 114. In the embodiment, the power factor correction and rectification circuit 114 may include an active power factor correction circuit, such as a switching power converter. The power factor correction and rectification circuit 114 may also include a full-bridge, a half-bridge rectifier, or other rectification circuit that may include diodes, capacitors, surge suppression, etc.

The resonant converter 118 may be controlled by a primary controller 120, which may vary parameters within the resonant converter 118, such as conduction time, conduction angle, duty cycle, switching, etc. The primary controller 120 may receive information from sensors and position detection 122 within or associated with the power converter apparatus 104. The primary controller 120 may also receive information wirelessly from the secondary receiver apparatus 106.

The power converter apparatus 104 includes a primary pad 126 (i.e. a primary WPT pad) that receives power from the resonant converter 118. In one embodiment, portions of the resonant converter 118 and primary pad 126 form a resonant circuit that enables efficient wireless power transfer across the gap 108. In another embodiment, the power converter apparatus 104 includes a switching power converter that is not a resonant converter. The gap 108, in some embodiments includes an air gap, but may also may partially or totally include other substances. For example, where the primary pad 126 is in a roadway, the gap 108 may include a resin, asphalt, concrete or other material just over the windings of the primary pad 126 in addition to air, snow, water, etc. between the primary pad 126 and a secondary pad 128 located in the secondary receiver apparatus 106.

The secondary receiver apparatus 106 includes a secondary pad 128 (i.e. a secondary WPT pad) connected to a secondary circuit 130 that delivers power to the load 110. The secondary receiver apparatus 106 may also include a secondary decoupling controller 132 that controls the secondary circuit 130 and may also be in communication with sensors and/or position detection 136 and wireless communications 134 coupled to the power converter apparatus 104.

In one embodiment, the secondary receiver apparatus 106 and load 110 are part of a vehicle 140 that receives power from the power converter apparatus 104. The load 110 may include a battery 138, a motor, a resistive load, a circuit or other electrical load. For example, the WPT system 100 may transfer power to a portable computer, a consumer electronic device, to an industrial load, or other portable load that would benefit from receiving power wirelessly.

In one embodiment, the secondary circuit 130 includes a portion of resonant circuit that interacts with the secondary pad 128 and that is designed to receive power at a resonant frequency. In another embodiment, the secondary circuit 130 includes a power conditioning circuit that is not a resonant circuit. The secondary circuit 130 may also include a rectification circuit, such as a full-bridge rectifier, a half-bridge rectifier, and the like. In another embodiment, the secondary circuit 130 includes a power converter of some type that receives power from the resonant circuit/rectifier and actively controls power to the load 110. For example, the secondary circuit 130 may include a switching power converter. In another embodiment, the secondary circuit 130 includes passive components and power to the load 110 is controlled by adjusting power in the power converter apparatus 104. In another embodiment, the secondary circuit 130 includes an active rectifier circuit that may receive and transmit power. One of skill in the art will recognize other forms of a secondary circuit 130 appropriate for receiving power from the secondary pad 128 and delivering power to the load 110.

The resonant converter 118, in one embodiment, includes an active switching section coupled to a resonant circuit formed with components of the resonant converter 118 and the primary pad 126. The resonant converter 118 is described in more detail with regard to FIG. 2.

Figure 2:
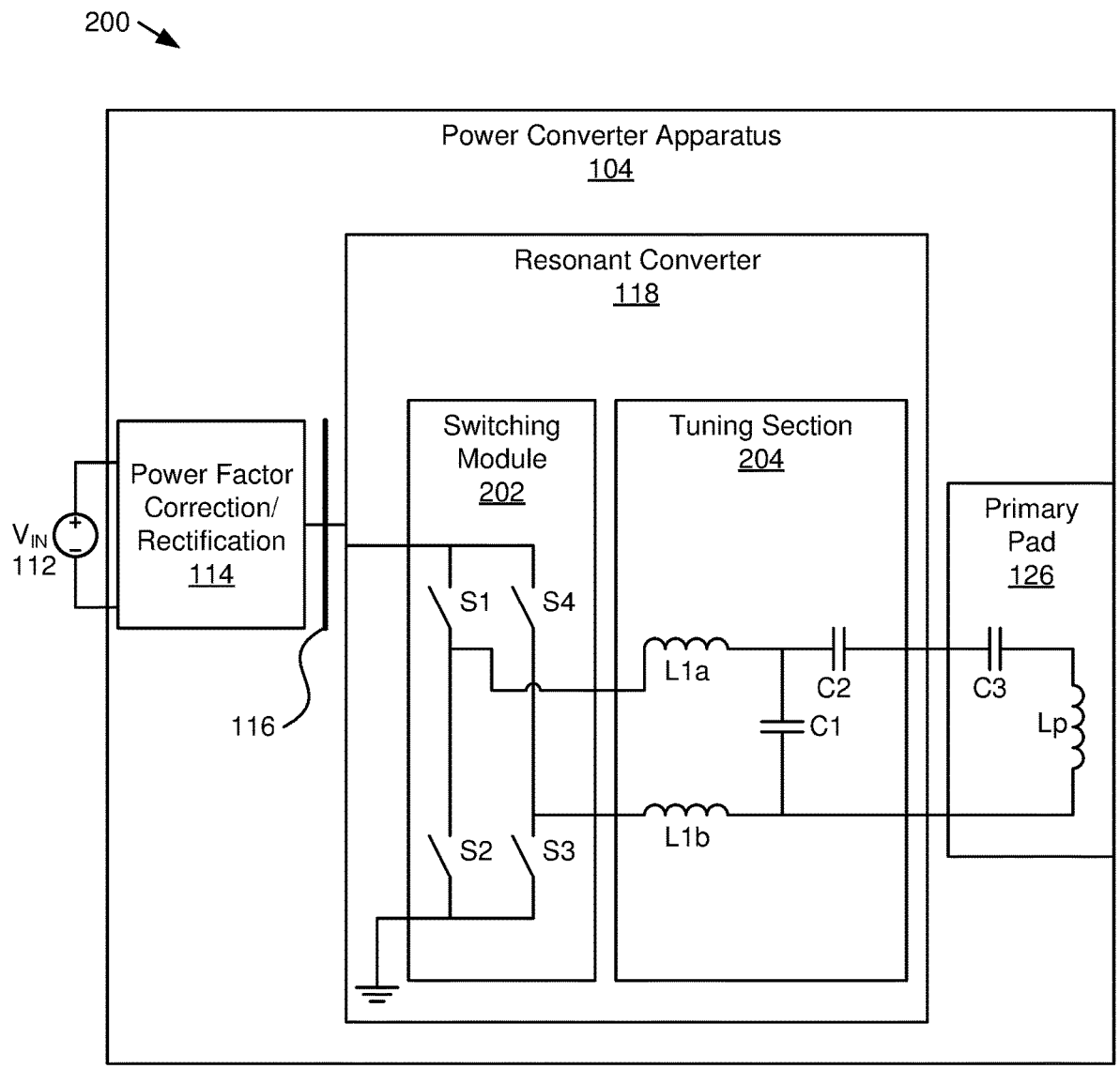
FIG. 2 is a schematic block diagram illustrating one embodiment of a power converter apparatus.

FIG. 2 is a schematic block diagram illustrating one embodiment of a power converter apparatus 104. The power converter apparatus 104 is connected to a power source 112 and includes a power factor correction and rectification circuit 114 connected to a DC bus 116 feeding a resonant converter 118 connected to a primary pad 126 as described with regard to the WPT system 100 of FIG. 1.

The resonant converter 118 includes a switching module 202 and a tuning section 204. In one embodiment, the switching module 202 includes four switches configured to connect the DC bus 116 and to ground. Typically, switches S1 and S3 close while switches S2 and S4 are open and vice-versa. When switches S1 and S3 are closed, the DC bus 116 is connected to a positive connection of the tuning section 204 through inductor L1a and the ground is connected to the negative connection of the tuning section 204 through inductor L1b while switches S2 and S4 are open. When switches S2 and S4 are closed, the ground is connected to the positive terminal of the tuning section 204 and the DC bus 116 is connected to the positive connection of the tuning section 204. Thus, the switching module alternates connection of the DC bus 116 and ground to the tuning section 204 simulating an AC waveform. The AC waveform is typically imperfect due to harmonics.

Typically, switches S1-S4 are semiconductor switches, such as a metal-oxide-semiconductor field-effect transistor ("MOSFET"), a junction gate field-effect transistor ("JFET"), a bipolar junction transistor ("BJT"), an insulated-gate bipolar transistor ("IGBT") or the like. Often the switches S1-S4 include a body diode that conducts when a negative voltage is applied. In some embodiments, the timing of opening and closing switches S1-S4 are varied to achieve various modes of operations, such as zero-voltage switching.

The tuning section 204 of the resonant converter 118 and the primary pad 126 are designed based on a chosen topology. For example, the resonant converter 118 and primary pad 126 may form an inductor-capacitor-inductor ("LCL") load resonant converter, a series resonant converter, a parallel resonant converter, and the like. The embodiment depicted in FIG. 2 includes an LCL load resonant converter.

Resonant converters include an inductance and capacitance that form a resonant frequency. When a switching frequency of the tuning section 204 is at or close to the resonant frequency, voltage with the tuning section 204 and primary pad 126 often increases to voltages levels higher than the voltage of the DC bus 116. For example, if the voltage of the DC bus 116 is 1 kilovolt ("kV"), voltage in the tuning section 204 and resonant converter 118 may be 3 kV or higher. The high voltages require component ratings, insulation ratings, etc. to be high enough for expected voltages.

The primary pad 126 includes capacitor C3 and inductor Lp while the tuning section 204 includes series capacitor C2. Capacitors C2 and C3 add to provide a particular capacitance that forms a resonant frequency with inductor Lp. In some embodiments, the power converter apparatus 104 includes a single series capacitor in the tuning section 204 or in the primary pad 126. While the FIG. 2 is focused on the resonant converter 118 and primary pad 126, the secondary receiver apparatus 106 includes a secondary pad 128 and a secondary circuit 130 that typically includes a tuning section 204 where the inductance of the secondary pad 128 and capacitance of the tuning section 204 of the secondary circuit 130 form a resonant frequency and the secondary pad 128 and secondary circuit 130 have voltage issues similar to the primary pad 126 and resonant converter 118. In other embodiments, the tuning section 204 and primary pad 126 are not designed to produce a resonance, but instead condition voltage from the switching module 202. For example, the tuning section 204 may filter out harmonic content without filtering a switching frequency.

Figure 3:
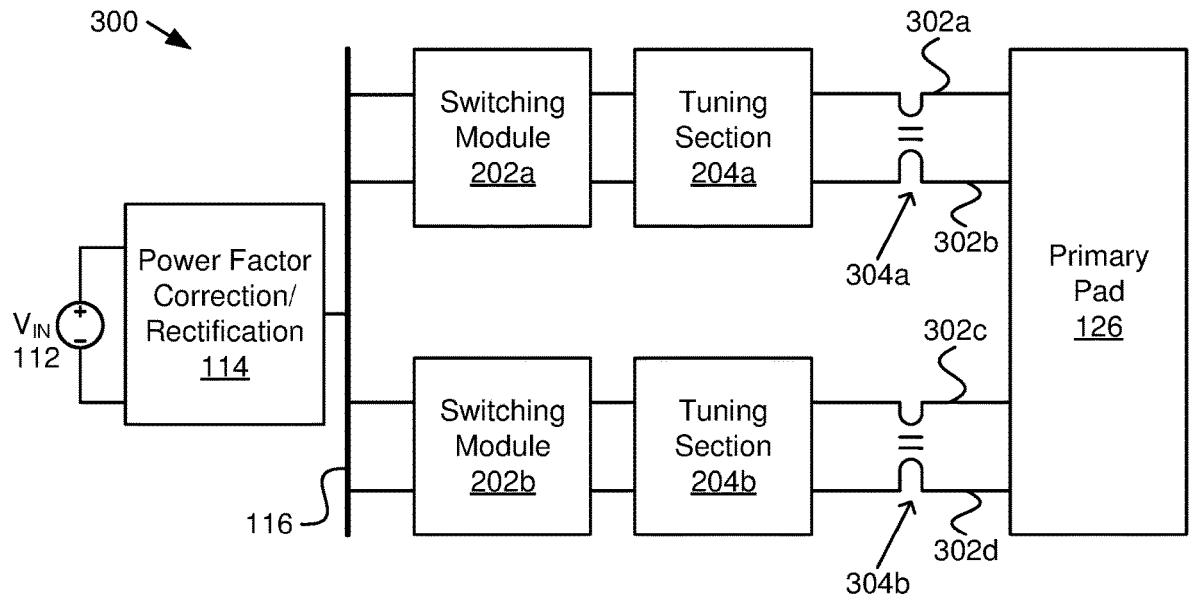
FIG. 3 is a schematic block diagram illustrating one embodiment of a primary portion of a WPT system with two switching modules and associated tuning sections feeding a primary WPT pad.

FIG. 3 is a schematic block diagram illustrating one embodiment of a primary portion of a WPT system 100 with two switching modules 202a, 202b and associated tuning sections 204a, 204b feeding a primary WPT pad 126. A switching section (e.g. 202a) and an associated tuning section (e.g. 204a) form a converter, such as an inverter, a resonant converter as depicted in FIG. 2, and the like. Coupled to the conductors 302a, 302b, 302c, 302d (generically or collectively "302") between each tuning section 204a, 204b and the primary pad 126 are one embodiment of a current sharing apparatus with four transformers 304a, 304b (generically or collectively "304") interconnecting conductors 302a-d of the tuning sections 204a, 204b of the resonant converters 118 with the primary pad 126.

In the example depicted in FIG. 3, the conductors 302a, 302b of the first tuning section 204a go through a first transformer 304a and the conductors 304c, 304d of the second tuning section 204b go through a second transformer 304b. Each transformer 304, in one embodiment, is a current transformer with a ferrite structure or magnetic core, such as a toroid, with the conductors 302 passing through the middle of the ferrite structure. In one embodiment, the conductors 302 pass through the ferrite structure without wrapping around a portion of the transformer, thus forming one winding. A conductor passing through a ferrite structure, such as a toroid is a common way to form a current transformer. Typically, a toroid includes a ferromagnetic material suitable for generating a magnetic flux due to current in the conductor(s). Often a secondary winding of a typical transformer will be wound around the ferrite structure "n" times forming a 1:n current ratio between the current in the primary and secondary conductors. In the depicted embodiment, the transformers 304 are to ensure equal sharing between a line and a return so the turns ratio is 1:1 or n:n.

The transformer 304 transfers electrical energy between two or more circuits through electromagnetic induction. A varying current in a primary winding, such as the conductor 302 produces a varying magnetic field in a ferrite structure of the transformer 304. The varying magnetic field in the ferrite structure affects current in a secondary winding. The ferrite structure may be a toroid or other ferro-magnetic structure. In an ideal transformer, coupling is perfect and the transformer appears as merely an ideal voltage or current transformation related by a ratio of the number of primary windings to the number of secondary windings.

However, transformers are not ideal and include leakage inductance, magnetizing inductance, resistance of the conductors, etc. In addition, coupling between the windings and the ferrite structure is not ideal and the structure of the transformer dictates the coupling and may be expressed as a coupling coefficient. The ferrite structure typically presents a significant amount of inductance so that the conductors 302 include a series inductor that is not insignificant.

On a typical two winding transformer with a primary winding with two connections and a secondary winding with two connections, the transformer is typically marked with a dot on one side of the primary winding and a dot on one side of the secondary winding. The dots indicate typical current flow. Due to magnetic coupling and the inductance of the transformer, if current is flowing into the primary winding at the dot, current will flow out of the secondary winding at the conductor with the second dot at a magnitude related by the turns ratio of the transformer. Any current deviation will cause voltages across the windings that will resist the current deviation.

Each transformer 304 includes a ferrite structure. The first conductor 302a and the second conductor 302b pass through the ferrite structure of the first transformer 304a in such a way so that a current from the first tuning section 204a to the primary pad 126 will compliment and not oppose the return current through the second conductor 302b from the primary pad 126 to the first tuning section 204a. The first conductor 302a and the second conductor 302b have the same number of windings around the ferrite structure of the first transformer 304a to encourage current in the first conductor 302a to be the same as the current in the second conductor 302b. Minor variations may exist between the two currents due to component variations, imperfect coupling, etc.

Thus, ideally the current through the first conductor 302a equals the current through the second conductor 302b, and current through the third conductor 402c equals the current through the fourth conductor 402d. In one embodiment, current in the first or second conductors 302a, 302b may match the current in the third or four conductors 302c, 302d using another transformer 304 or another mechanism, as discussed below with regard to FIG. 4.

Where a tuning section (e.g. 204a) and a primary pad 126 attempt to operate with a current in a conductor (e.g. 302a) between the tuning section 204a and primary pad 126 different than the other conductor 302b, the transformer 304a through which the first conductor 302a passes will oppose the different current and will urge the current in the first conductor 302a to equal the currents in the other conductor 302b. While transformers 304a-d are not depicted between the switching modules 202a-d and tuning sections 204a-d, in another embodiment transformers 304a-b may also be included along with the transformers 304a-b in the embodiment 300 of FIG. 3.

One of skill in the art will recognize that minor variations may exist between the currents due to component variations and other conditions. While the example in FIG. 3 depicts two resonant converters 118 and a single primary pad 126, the equal current sharing technique is equally applicable to more or less parallel resonant converters 118 and additional primary pads 126. In addition, the technique depicted in the embodiment 300 of FIG. 3 may be used elsewhere, such as between the switching modules 202a-b and tuning sections 204a-b.

Figure 4:
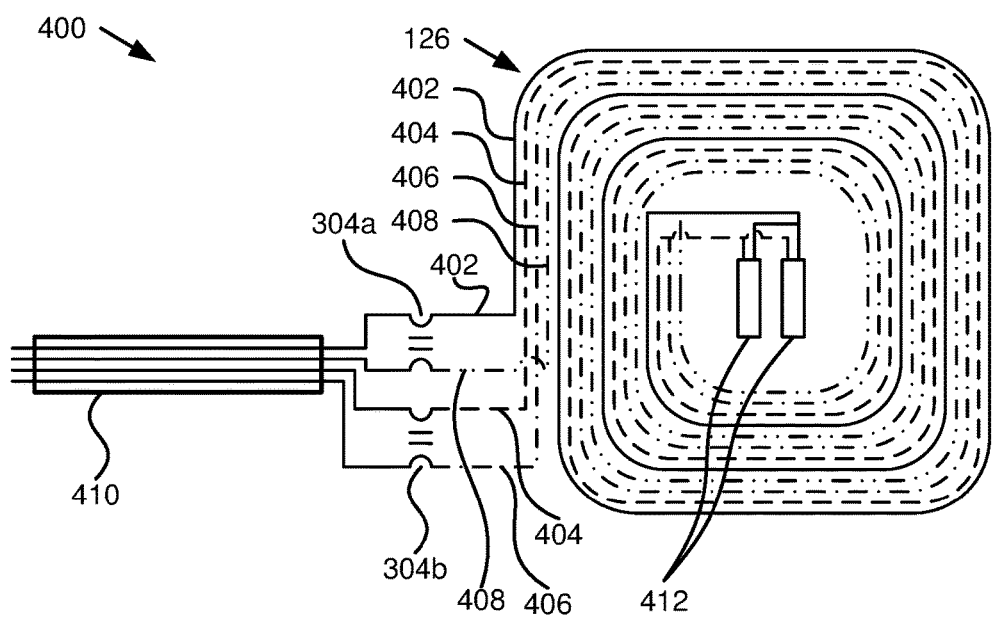
FIG. 4 is a schematic block diagram illustrating one embodiment of a WPT pad with four windings and an a four-conductor cable connected to the WPT pad.
Figure 5:
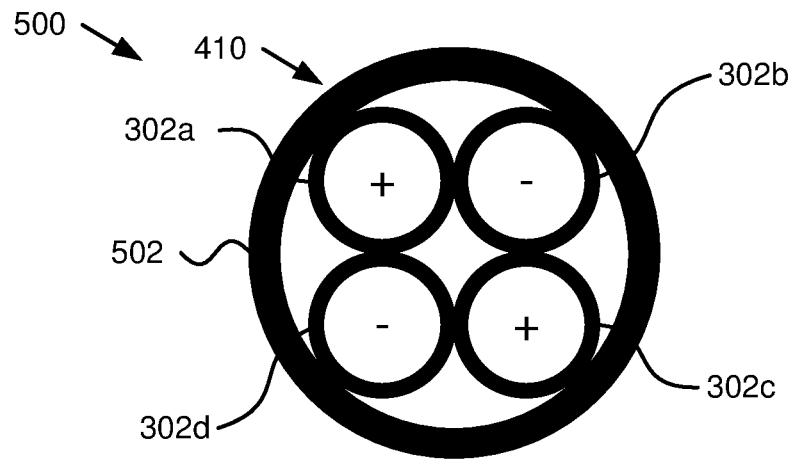
FIG. 5 is a schematic block diagram illustrating one embodiment of a cross section of the four-conductor cable depicted in FIG. 4.
Figure 6A:
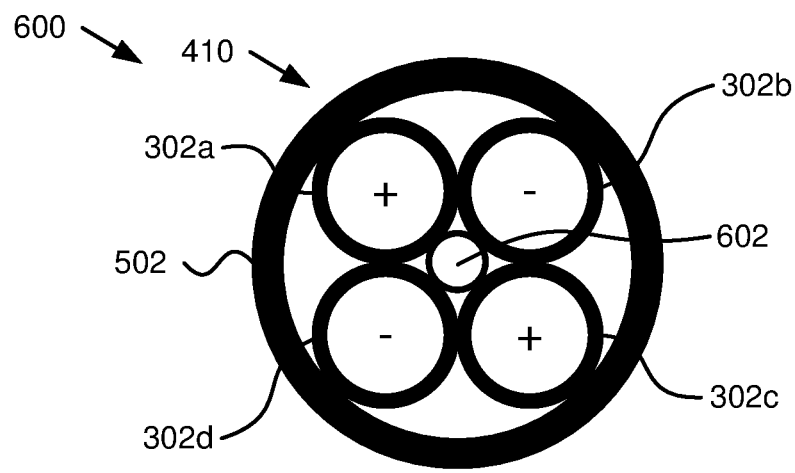
FIG. 6A is a schematic block diagram illustrating another embodiment of a cross section of the four-conductor cable depicted in FIG. 4 that includes a signal cable in the center.

In addition, the conductors 302a-d may be bundled together in a transmission cable [hereinafter "cable"] in a way that minimizes electromagnetic radiation from the cable, as depicted in FIGS. 4, 5 and 6A. Maintaining equal current sharing between the cables 302a-d contributes to a cancellation effect that minimizes electromagnetic emissions from the cable.

FIG. 4 is a schematic block diagram illustrating one embodiment 400 of a WPT pad with four windings 402, 404, 406, 408 and an a four-conductor cable 410 connected to the WPT pad 126. Transformers 304a, 304b are located between the cable 410 and the WPT pad 126. In some embodiments, the transformers 304a, 304b are located between the tuning sections 204a, 204b and the cable. The windings 402, 404, 406 and 408 correlate to the conductors 302a-d of FIG. 3.

In the depicted embodiment, the outside winding 402 and inside winding 408 are connected together at a first terminal of one or more capacitors 412 and the middle winding 404 and 406 connect to a second terminal of the one or more capacitors 412. The windings 402-408 are different lengths so connecting the longest winding 402 with the shortest winding 408 and connecting the middle windings 404, 406 helps to equalize inductance differences between the windings 402-408. In addition, connection of the windings 402-408 as depicted along with the transformers 304s, 304b help to equalize the currents in the conductors 302a-d of the cable 410.

FIG. 5 is a schematic block diagram illustrating one embodiment of a cross section of the four-conductor cable 410 depicted in FIG. 4. The cable 410 includes a first conductor 302a with current flowing in a positive direction and a second conductor 302b with a current flowing in a negative direction, where the negative direction opposite the positive direction. The current in the first conductor 302a is equal to the current in the second conductor 302b. The cable 410 includes a third conductor 302c with current flowing in the positive direction and a fourth conductor 302d with a current flowing in the negative direction, where the current in the third conductor 302c equal to the current in the fourth conductor 302d. The first conductor 302a, the second conductor 302b, the third conductor 302c, and the fourth conductor 302d are arranged in a symmetrical square pattern. The conductors 302a-d are each on a corner of the square pattern and the first conductor 302a is opposite the third conductor 302c and adjacent to the second conductor 302b and the fourth conductor 302d.

The cable 410 minimizes electromagnetic radiation due to the symmetrical design, equal or near equal currents, and because the electromagnetic field generated by each cable 302a-d cancel each other out. In addition, the electromagnetic field in the center of the cable 410 is negligible and is suitable for signal conductors or other conductors that would be affected by electromagnetic interference.

In one embodiment, the first conductor 302a and the second conductor 302b are part of a first circuit, such as from the first tuning section 204a and the third conductor 302c and the fourth conductor 302d are part of a second circuit, such as from the second tuning section 204b. Typically, a positive and a negative conductor from a circuit have equal but opposite currents. For example, a circuit, as used herein refers to a device, an apparatus, etc. with a line conductor (i.e. positive) and return conductor (i.e. negative) where the same current flowing into the circuit from the positive conductor flows in an opposite direction from the negative conductor. In a further embodiment, the current in the first and second conductors 302a, 302b are equal to the current in the third and fourth conductors 302c, 302d.

In some embodiments, first, second, third and fourth conductors 302a, 302b, 302c, 302d each have an insulating sheath and the cable 410 has an outer sheath 502 surrounding the conductors 302a-d in the square pattern. The outer sheath 502, in one embodiment, is rated for underground installation. For example, the outer sheath 502 may be watertight. In addition, the outer sheath 502 provides electrical insulation and may be of a material that is resistant to cuts, scrapes, etc. In one embodiment, the outer sheath 502 allows the cable 410 to be direct buried. In another embodiment, the outer sheath 502 is suitable for underground installation in a conduit. One of skill in the art will recognize other characteristics of an outer sheath 502 rated for underground installation.

In some embodiments, the cable 410 includes material placed between conductors 302a-d and between the conductors 302a-d and the outer sheath 502 to maintain the conductors 302a-d in a symmetrical, square pattern. For example, the material may be packing material and may also have some electrical insulating characteristics.

Figure 6B:
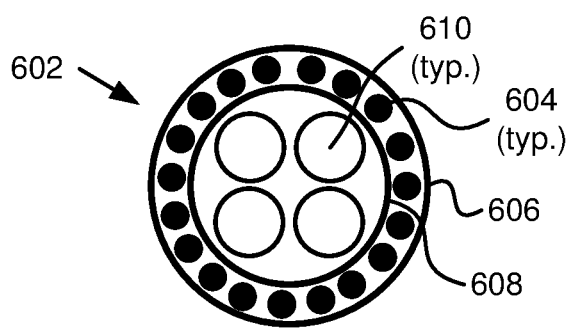
FIG. 6B is a schematic block diagram illustrating one embodiment of an enlarged view of the cross section of the signal cable of the four-conductor cable depicted in FIG. 6A.

FIG. 6A is a schematic block diagram illustrating another embodiment 600 of a cross section of the four-conductor cable 410 depicted in FIG. 4 that includes a signal cable 602 in the center. FIG. 6B is a schematic block diagram illustrating one embodiment of an enlarged view of the cross section of the signal cable 602 of the four-conductor cable 410 depicted in FIG. 6A. The cable 410 includes one or more signal conductors 610 located in a center of the square pattern, which are part of the signal cable 602. In some embodiments, the first, second, third and fourth conductors 302a-d are power transmission conductors and the one or more signal conductors 610 transmit data associated with power transmission of the first, second, third and fourth conductors 302a-d.

In one embodiment, the signal cable 602 includes grounded conductors 604 surrounding the one or more signal conductors 610. For example, the grounded conductors 604 may be individual strands, as depicted in FIG. 6B, may be a woven mesh of conductors, may include a metallic foil, or other grounded conductor design that surrounds the one or more signal conductors 610. In one embodiment, the grounded conductors 604 provide additional shielding to the one or more signal conductors 610.

In one embodiment, the signal cable includes insulation 608 between the one or more signal conductors 610 and the grounded conductors 604. The signal cable 602, in some embodiments, includes insulation 606 between the grounded conductors 604 and the first, second, third and fourth conductors 302a-d. The insulation 606, 608, in one embodiment, provides electrical insulation between the one or more signal conductors 610, the grounded conductors 604 and power conductors 302a-d. In another embodiment, the insulation 608 surrounding the one or more signal conductors 610 provides support to maintain the signal conductors 610 in a pattern. Other insulation may also be included between and surrounding the one or more signal conductors 610. One of skill in the art will recognize appropriate insulation 606, 608 for the signal cable 602.

Placing the signal cable 602 in a center of the cable 410 efficiently provides a location for the one or more signal conductors 610 due to the cancellation effect of the electromagnetic field radiated from the conductors 302a-d when the conductors 302a-d are arranged symmetrically and have an equal or substantially equal amount of current. The grounded conductors 604 provide additional shielding. The signal cable 602 provides a convenient way of transmitting signals associated with wireless power transfer between one or more resonant converters 118 and a primary pad 126.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transmission cable comprising:
   a first conductor with current flowing in a positive direction;
   a second conductor with a current flowing in a negative direction, the negative direction opposite the positive direction, the current in the first conductor equal to the current in the second conductor;
   a third conductor with current flowing in the positive direction;
   a fourth conductor with a current flowing in the negative direction, the current in the third conductor equal to the current in the fourth conductor, wherein the first conductor, the second conductor, the third conductor, and the fourth conductor are arranged in a symmetrical square pattern from a beginning to an end of the cable, the conductors each on a corner of the square pattern, the first conductor opposite the third conductor and adjacent to the second conductor and the fourth conductor; and
   one or more signal conductors located in a center of the square pattern, wherein the first, second, third and fourth conductors are alternating current ("AC") power transmission conductors and the one or more signal conductors transmit data associated with power transmission of the first, second, third and fourth conductors.

2. The transmission cable of claim 1, further comprising grounded conductors surrounding the one or more signal conductors.

3. The transmission cable of claim 2, further comprising insulation between the one or more signal conductors and the grounded conductors and insulation between the grounded conductors and the first, second, third and fourth conductors.

4. The transmission cable of claim 1, wherein each of the first conductor, the second conductor, the third conductor, and the fourth conductor comprise litz wire.

5. The transmission cable of claim 1, wherein the first conductor and the second conductor are part of a first circuit, and the third conductor and the fourth conductor are part of a second circuit.

6. The transmission cable of claim 1, wherein the current in the first and second conductors is equal to the current in the third and fourth conductors.

7. The transmission cable of claim 1, wherein the first, second, third and fourth conductors each comprise an insulating sheath and further comprising an outer sheath surrounding the conductors in the square pattern, the outer sheath rated for underground installation.

8. The transmission cable of claim 7, wherein the outer sheath is watertight.

9. The transmission cable of claim 7, wherein the transmission cable transmits power between a wireless power transmission ("WPT") pad and a converter within a WPT system.

10. A transmission cable comprising:
    a first conductor with current flowing in a positive direction;
    a second conductor with a current flowing in a negative direction, the negative direction opposite the positive direction, the current in the first conductor equal to the current in the second conductor;
    a third conductor with current flowing in the positive direction;
    a fourth conductor with a current flowing in the negative direction, the current in the third conductor equal to the current in the fourth conductor, wherein the first conductor, the second conductor, the third conductor, and the fourth conductor are alternating current ("AC") power transmission conductors and are arranged in a symmetrical square pattern from a beginning to an end of the cable, the conductors each on a corner of the square pattern, the first conductor opposite the third conductor and adjacent to the second conductor and the fourth conductor;
    a signal conductor located in a center of the square pattern, wherein the signal conductor transmits data associated with power transmission of the first, second, third and fourth conductors;
    grounded conductors surrounding the signal conductor; and insulation between the signal conductor and the grounded conductors and insulation between the grounded conductors and the first, second, third and fourth conductors.

11. The transmission cable of claim 10, wherein each of the first conductor, the second conductor, the third conductor, and the fourth conductor comprise litz wire.

12. The transmission cable of claim 10, wherein the first conductor and the second conductor are part of a first circuit, and the third conductor and the fourth conductor are part of a second circuit.

13. The transmission cable of claim 10, wherein the current in the first and second conductors is equal to the current in the third and fourth conductors.

14. The transmission cable of claim 10, wherein the first, second, third and fourth conductors each comprise an insulating sheath and further comprising an outer sheath surrounding the conductors in the square pattern, the outer sheath rated for underground installation.

15. The transmission cable of claim 14, wherein the outer sheath is watertight.

16. The transmission cable of claim 14, wherein the transmission cable transmits power between a wireless power transmission ("WPT") pad and a converter within a WPT system.

17. A transmission cable comprising:
a first conductor with current flowing in a positive direction;
a second conductor with a current flowing in a negative direction, the negative direction opposite the positive direction, the current in the first conductor equal to the current in the second conductor;
a third conductor with current flowing in the positive direction;
a fourth conductor with a current flowing in the negative direction, the current in the third conductor equal to the current in the fourth conductor, wherein the first conductor, the second conductor, the third conductor, and the fourth conductor each comprise litz wire, each comprise an outer sheath, are alternating current ("AC") power transmission conductors and are arranged in a symmetrical square pattern from a beginning to an end of the cable, the conductors each on a corner of the square pattern, the first conductor opposite the third conductor and adjacent to the second conductor and the fourth conductor;
a signal conductor located in a center of the square pattern, wherein the signal conductor transmits data associated with power transmission of the first, second, third and fourth conductors;
grounded conductors surrounding the signal conductor;
insulation between the signal conductor and the grounded conductors and insulation between the grounded conductors and the first, second, third and fourth conductors;
an outer sheath surrounding the conductors in the square pattern, the outer sheath rated for underground installation,
wherein the current in the first and second conductors is equal to the current in the third and fourth conductors.

* * * * *